United States Patent
Shibaike et al.

(10) Patent No.: US 12,457,141 B2
(45) Date of Patent: Oct. 28, 2025

(54) TERMINAL

(71) Applicant: NTT DOCOMO, INC., Tokyo (JP)

(72) Inventors: Naoya Shibaike, Tokyo (JP); Hiroki Harada, Tokyo (JP); Satoshi Nagata, Tokyo (JP); Juan Liu, Beijing (CN); Wenjia Liu, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 348 days.

(21) Appl. No.: 17/924,892

(22) PCT Filed: May 14, 2020

(86) PCT No.: PCT/JP2020/019356
§ 371 (c)(1),
(2) Date: Nov. 11, 2022

(87) PCT Pub. No.: WO2021/229775
PCT Pub. Date: Nov. 18, 2021

(65) Prior Publication Data
US 2023/0198820 A1 Jun. 22, 2023

(51) Int. Cl.
*H04L 27/26* (2006.01)

(52) U.S. Cl.
CPC ...... *H04L 27/2607* (2013.01); *H04L 27/2614* (2013.01)

(58) Field of Classification Search
CPC .... H04J 1/00; H04L 27/2607; H04L 27/2614; H04L 27/2644; H04L 27/26546; H04L 27/26025; H04L 27/2636; H04L 27/26526
See application file for complete search history.

(56) References Cited

U.S. PATENT DOCUMENTS

| | | | |
|---|---|---|---|
| 2018/0359123 A1* | 12/2018 | Kimura | H04L 27/26 |
| 2020/0275418 A1* | 8/2020 | Wong | H04L 5/0007 |

FOREIGN PATENT DOCUMENTS

| | | |
|---|---|---|
| WO | 2014174754 A1 | 10/2014 |
| WO | 2017/115609 A1 | 7/2017 |

OTHER PUBLICATIONS

Office Action issued in Japanese Patent Application No. 2022-522456, mailed on Dec. 5, 2023 (6 pages).
International Search Report issued in PCT/JP2020/019356 on Dec. 8, 2020 (2 pages).
Written Opinion of the International Searching Authority issued in PCT/JP2020/019356 on Dec. 8, 2020 (3 pages).
3GPP TS 38.211 V15.8.0; "3rd Generation Partnership Project; Technical Specification Group Radio Access Network; NR; Physical channels and modulation (Release 15)"; Dec. 2019 (97 pages).
Lin, H. et al.; "An Efficient FTN Implementation of the OFDM/OQAM System"; 2015 IEEE International Conference on Communications (ICC), London, 2015, pp. 4787-4792 (6 pages).

(Continued)

*Primary Examiner* — Asad M Nawaz
*Assistant Examiner* — Natali Pascual Peguero
(74) *Attorney, Agent, or Firm* — Osha Bergman Watanabe & Burton LLP

(57) ABSTRACT

A terminal transmits and receives a slot configured with a plurality of symbols. The terminal sets a length of a cyclic prefix added to each symbol based on a degree of compression of each symbol in time domain.

3 Claims, 22 Drawing Sheets

(56) References Cited

OTHER PUBLICATIONS

Qualcomm; "New WID on Extending current NR operation to 71 GHz"; 3GPP TSG RAN Meeting #86, RP-193229; Sitges, Spain; Dec. 9-12, 2019 (5 pages).
Office Action issued in Japanese Patent Application No. 2024-091690, issued Mar. 25, 2025 (8 pages).

* cited by examiner

FIG. 3

| | |
|---|---|
| | CP length is based on time domain compression factor $\alpha$:<br>$N_{CP}^{\alpha} = N_{CP}^{o} / \alpha$ |
| | $T_{CP} = T_{\text{multipath delay}} + T_{\text{filter truncated length}}$ |
| Before compression | $T_{CP}$, $T_u$ ($N_f$ samples)<br>$T_u + T_{CP}$ ($N + N_{CP}^{o}$ samples) |
| After compression | $T_{CP}$, $\alpha T_u$ ($N_f$ samples)<br>$\alpha T_u + T_{CP}$ ($N + \dfrac{N_{CP}^{o}}{\alpha}$ samples) |

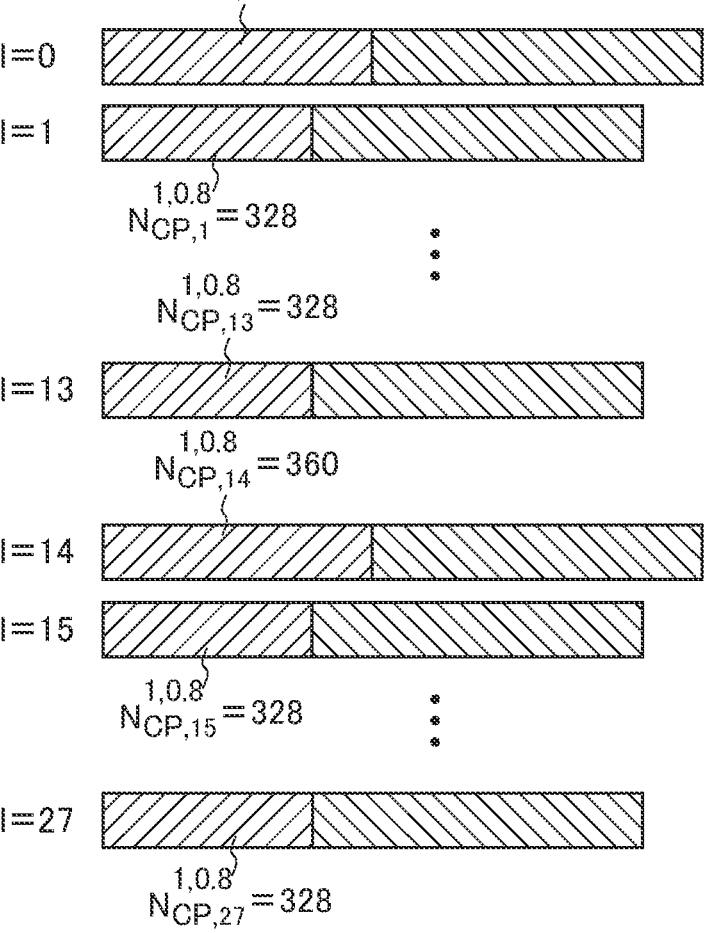

FIG. 11C
$$\alpha = 0.5$$
$$N_{CP,l}^{1,0.5} = N_{CP1,l}^{1,\alpha_{min}} + N_{CP2,l}^{1,\alpha_{min}}$$
$$= \begin{cases} \left\lceil \frac{160}{0.5} \right\rceil + \left\lceil \frac{20}{0.5} \right\rceil = 360 & l=0 \text{ or } l=14 \\ \left\lceil \frac{144}{0.5} \right\rceil + \left\lceil \frac{20}{0.5} \right\rceil = 328 & l \neq 0 \text{ and } l \neq 14 \end{cases}$$
l=0
l=1
⋮
l=13
$N_{CP,14}^{1,0.5} = 360$
l=14
l=15
⋮
l=27
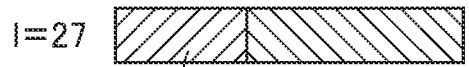

FIG. 12A $$\alpha = 1$$

$$N_{CP,l}^{1,1} = N_{CP1,l}^{1,\alpha_{min1}} + N_{CP2,l}^{1,\alpha_{min1}}$$

$$= \begin{cases} \left\lceil \dfrac{160}{0.8} \right\rceil + \left\lceil \dfrac{20}{0.8} \right\rceil = 225 & l=0 \text{ or } l=14 \\ \left\lceil \dfrac{144}{0.8} \right\rceil + \left\lceil \dfrac{20}{0.8} \right\rceil = 205 & l \neq 0 \text{ and } l \neq 14 \end{cases}$$

$l=0$  $\quad N_{CP,0}^{1,1}=225$ $l=1$  $\quad N_{CP,1}^{1,1}=205$ $\vdots$ $N_{CP,13}^{1,1}=205$ $l=13$ $N_{CP,14}^{1,1}=225$ $l=14$ $l=15$  $\quad N_{CP,15}^{1,1}=205$ $\vdots$ $l=27$  $\quad N_{CP,27}^{1,1}=205$

FIG. 12B $$\alpha = 0.8$$

$$N_{CP,l}^{1,0.8} = N_{CP1,l}^{1,\alpha_{min1}} + N_{CP2,l}^{1,\alpha_{min1}}$$

$$= \begin{cases} \left\lceil \dfrac{160}{0.8} \right\rceil + \left\lceil \dfrac{20}{0.8} \right\rceil = 225 & l=0 \text{ or } l=14 \\ \left\lceil \dfrac{144}{0.8} \right\rceil + \left\lceil \dfrac{20}{0.8} \right\rceil = 205 & l \neq 0 \text{ and } l \neq 14 \end{cases}$$

$N_{CP,0}^{1,0.8} = 225$ l=0 l=1

$N_{CP,1}^{1,0.8} = 205$ $N_{CP,13}^{1,0.8} = 205$ l=13

$N_{CP,14}^{1,0.8} = 225$ l=14 l=15

$N_{CP,15}^{1,0.8} = 205$ l=27

$N_{CP,27}^{1,0.8} = 205$

FIG. 12C $$\alpha = 0.5$$

$$N_{CP,l}^{1,0.5} = N_{CP1,l}^{1,\alpha_{min2}} + N_{CP2,l}^{1,\alpha_{min2}}$$

$$= \begin{cases} \left\lceil \dfrac{160}{0.5} \right\rceil + \left\lceil \dfrac{20}{0.5} \right\rceil = 360 & l=0 \text{ or } l=14 \\ \left\lceil \dfrac{144}{0.5} \right\rceil + \left\lceil \dfrac{20}{0.5} \right\rceil = 328 & l\neq 0 \text{ and } l\neq 14 \end{cases}$$

Table for compression factor for MCS 0

| Compression Factor field | Compression Factor $\alpha$ |
|---|---|
| 0000 | 0.95 (lossless compression) |
| 0001 | 0.83 (PAPR optimization) |
| 0010 | 0.38 (Throughput optimization) |
| 0011 | 0.9 |
| 0100 | 0.8 |
| 0101 | 0.75 |
| 0110 | 0.7 |
| 0111 | 0.65 |
| 1000 | 0.6 |
| 1001 | 0.55 |
| 1010 | 0.5 |
| 1011 | 0.45 |
| 1100 | 0.4 |
| 1101 |  |
| 1110 |  |
| 1111 |  |

Other supported values (0011–1100)

FIG. 15

Table for compression factor for MCS 10

| Compression Factor field | Compression Factor $\alpha$ |
|---|---|
| 000 | 0.95 (lossless compression) |
| 001 | 0.83 (PAPR optimization) |
| 010 | 0.64 (Throughput optimization) |
| 011 | 0.9 |
| 100 | 0.8 |
| 101 | 0.75 |
| 110 | 0.7 |
| 111 | 0.65 |

Other supported values (011–111)

FIG. 16

Table for compression factor for MCS 28

| Compression Factor field | Compression Factor $\alpha$ |
|---|---|
| 00 | 0.95 (lossless compression) |
| 01 | 0.9 (PAPR optimization) |
| 10 | 0.9 (Throughput optimization) |
| 11 | |

FIG. 17

| CompressionFactor Lossless field | Compression factor $\alpha$ |
|---|---|
| 0 | 0.95 |
| 1 | 0.95 |
| 2 | 0.95 |
| 3 | 0.95 |
| 4 | 0.95 |
| 5 | 0.95 |
| 6 | 0.95 |
| 7 | 0.95 |
| 8 | 0.95 |
| 9 | 0.95 |
| 10 | 0.95 |
| 11 | 0.95 |
| 12 | 0.95 |
| 13 | 0.95 |
| 14 | 0.95 |
| 15 | 0.95 |
| 16 | 0.95 |
| 17 | 0.95 |
| 18 | 0.95 |
| 19 | 0.95 |
| 20 | 0.95 |
| 21 | 0.95 |
| 22 | 0.95 |
| 23 | 0.95 |
| 24 | 0.95 |
| 25 | 0.95 |
| 26 | 0.95 |
| 27 | 0.95 |
| 28 | 0.95 |

FIG. 18

| CompressionFactor Papr field | Compression factor $\alpha$ |
|---|---|
| 0 | 0.83 |
| 1 | 0.83 |
| 2 | 0.83 |
| 3 | 0.83 |
| 4 | 0.83 |
| 5 | 0.83 |
| 6 | 0.83 |
| 7 | 0.83 |
| 8 | 0.83 |
| 9 | 0.83 |
| 10 | 0.83 |
| 11 | 0.83 |
| 12 | 0.83 |
| 13 | 0.83 |
| 14 | 0.83 |
| 15 | 0.83 |
| 16 | 0.83 |
| 17 | 0.83 |
| 18 | To be determined |
| 19 | To be determined |
| 20 | To be determined |
| 21 | To be determined |
| 22 | To be determined |
| 23 | 0.9 |
| 24 | 0.9 |
| 25 | 0.9 |
| 26 | 0.9 |
| 27 | 0.9 |
| 28 | 0.9 |

FIG. 19

| CompressionFactor Throughput field | Compression factor $\alpha$ |
|---|---|
| 0 | 0.38 |
| 1 | To be determined |
| 2 | To be determined |
| 3 | To be determined |
| 4 | To be determined |
| 5 | 0.5 |
| 6 | To be determined |
| 7 | To be determined |
| 8 | To be determined |
| 9 | To be determined |
| 10 | 0.64 |
| 11 | 0.64 |
| 12 | To be determined |
| 13 | 0.77 |
| 14 | To be determined |
| 15 | To be determined |
| 16 | 0.83 |
| 17 | 0.83 |
| 18 | To be determined |
| 19 | To be determined |
| 20 | To be determined |
| 21 | To be determined |
| 22 | To be determined |
| 23 | To be determined |
| 24 | To be determined |
| 25 | To be determined |
| 26 | To be determined |
| 27 | To be determined |
| 28 | 0.9 |

TERMINAL

TECHNICAL FIELD

The present disclosure relates to a terminal that performs radio communication, and more particularly, to a terminal that supports time-domain compression such as Faster-Than-Nyquist (FTN) transmission.

BACKGROUND ART

The 3rd Generation Partnership Project (3GPP) specifies the 5th generation mobile communication system (which is also called 5G, New Radio (NR), or Next Generation (NG)). Moreover, specification of the next generation called Beyond 5G, 5G Evolution, or 6G has been conducted.

In the Release 15 (NR) specification of 3GPP, it is specified that a radio frame (10 ms) is configured with a plurality of subframes (1 ms), and that a slot is configured with 14 symbols (Non Patent Literature 1).

Further, the current NR specification is based on the Nyquist rate and does not support Faster-Than-Nyquist (FTN) transmission. The FTN can improve frequency utilization efficiency (SE) as compared with Nyquist rate transmission by multiplexing symbols at a rate higher than the Nyquist rate (Non Patent Literature 2).

Specifically, the FTN allows inter-symbol interference (ISI) and inter-subcarrier interference (ICI) to multiplex symbols and/or subcarriers with high density, thereby improving the frequency utilization efficiency.

In addition, NR that supports a frequency band beyond 52.6 GHz and up to 71 GHz is also under study (Non Patent Literature 3). In addition, Beyond 5G, 5G Evolution, or 6G (Release-18 or later) aims to support a frequency band beyond 71 GHz.

CITATION LIST

Non Patent Literature

Non Patent Literature 1: 3GPP TS 38.211 V15.8.0, 3rd Generation Partnership Project; Technical Specification Group Radio Access Network; NR; Physical channels and modulation (Release 15), 3GPP, December 2019

Non Patent Literature 2: H. Lin, N. Lahbabi, P. Siohan and X. Jiang, "An efficient FTN implementation of the OFDM/OQAM system", 2015 IEEE International Conference on Communications (ICC), London, 2015, pp. 4787-4792

Non Patent Literature 3: "New WID on Extending current NR operation to 71 GHz", RP-193229, 3GPP TSG RAN Meeting #86, 3GPP, December 2019

SUMMARY OF INVENTION

When using a high frequency band beyond 52.6 GHz, an increase of phase noise and propagation loss becomes a problem. Further, it becomes more sensitive to a peak-to-average power ratio (PAPR) and nonlinearity of a power amplifier.

To solve such a problem, a combination of FTN in the time domain and Discrete Fourier Transform-Spread Orthogonal Frequency Division Multiplexing (DFT-s-OFDM) can be considered. As a result, it is possible to improve both the frequency utilization efficiency and the PAPR.

However, considering the fact that a time-domain compression rate (which may also be called compression factor) based on the FTN is variable, a relationship between the compression rate and a length of a cyclic prefix (CP) added to an OFDM symbol may not always be appropriate.

In this regard, the following disclosure has been made in view of such a situation, and an object of the following disclosure is to provide a terminal that can set an appropriate cyclic prefix (CP) according to a time-domain compression rate in a case of applying Faster-Than-Nyquist (FTN) or the like.

An aspect of the present disclosure is a terminal (UE 200) including: a transmitting and receiving unit (FTN modulation module and FTN demodulation module) that transmits and receives a slot configured with a plurality of symbols; and a control unit that sets a length of a cyclic prefix added to each of the symbols based on a degree of compression of each of the symbols in time domain.

One aspect of the present disclosure is a terminal (UE 200) including a transmitting and receiving unit (FTN modulation module and FTN demodulation module) that transmits and receives a slot configured with a plurality of symbols; and a control unit that sets a compression factor applied to time domain of each of the symbols, wherein the control unit sets the compression factor associated with each of a plurality of different indicators.

BRIEF DESCRIPTION OF DRAWINGS

FIG. 3 is a diagram illustrating a configuration example of a CP and OFDM symbol before and after FTN modulation (compression) in the time domain.

FIG. 11B is a diagram illustrating a configuration example (part 1, $\alpha$=0.8) of the CP and OFDM symbol according to Operation Example 1-2-2.

FIG. 11C is a diagram illustrating a configuration example (part 1, $\alpha$=0.5) of the CP and OFDM symbol according to Operation Example 1-2-2.

FIG. 12A is a diagram illustrating a configuration example (part 2, α=1) of the CP and OFDM symbol according to Operation Example 1-2-2.

FIG. 12B is a diagram illustrating a configuration example (part 2, α=0.8) of the CP and OFDM symbol according to Operation Example 1-2-2.

FIG. 12C is a diagram illustrating a configuration example (part 2, α=0.5) of the CP and OFDM symbol according to Operation Example 1-2-2.

FIG. 14 is a diagram illustrating an example (MCS 0) of a table for a compression factor (α) according to Operation Example 2-1.

FIG. 15 is a diagram illustrating an example (MCS 10) of a table for a compression factor (α) according to Operation Example 2-1.

FIG. 16 is a diagram illustrating an example (MCS 28) of a table for a compression factor (α) according to Operation Example 2-1.

FIG. 17 is a diagram illustrating an example (lossless compression) of a table for a compression factor (α) according to Operation Example 2-2.

FIG. 18 is a diagram illustrating an example (PAPR optimization) of the table for the compression factor (α) according to Operation Example 2-2.

FIG. 19 is a diagram illustrating an example (throughput optimization) of the table for the compression factor (α) according to Operation Example 2-2.

DESCRIPTION OF EMBODIMENTS

Figure 1:
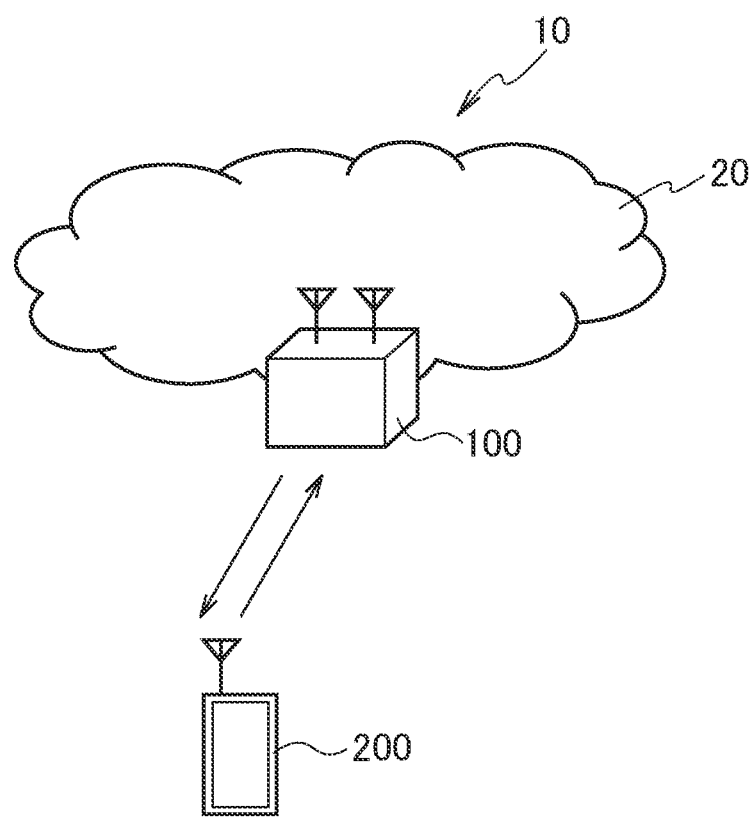
FIG. 1 is an overall schematic configuration diagram of a radio communication system 10.

Hereinafter, embodiments will be described with reference to the drawings. The same functions and configurations are denoted by the same or similar reference numerals, and a description thereof will be omitted as appropriate.

(1) Overall Schematic Configuration of Radio Communication System

FIG. 1 is an overall schematic configuration diagram of a radio communication system 10 according to the present embodiment. The radio communication system 10 is a radio communication system according to 5G new radio (NR), and includes a Next Generation-Radio Access Network 20 (hereinafter, referred to as an NG-RAN 20) and a terminal 200 (hereinafter, referred to as a user equipment (UE) 200).

The NG-RAN 20 includes a radio base station 100 (hereinafter, referred to as a gNB 100). Note that a specific configuration of the radio communication system 10 including the number of gNBs and UEs is not limited to the example illustrated in FIG. 1.

The NG-RAN 20 actually includes a plurality of NG-RAN nodes, specifically, gNBs (or ng-eNBs), and is connected to a core network (5GC) (not illustrated) according to 5G. Note that the NG-RAN 20 and the 5GC may be simply expressed as a "network".

The gNB 100 is a radio base station according to 5G, and performs radio communication with the UE 200 according to 5G. The gNB 100 and the UE 200 can support massive Multiple-Input Multiple-Output (MIMO) in which a beam with higher directivity is formed by controlling a radio signal transmitted from a plurality of antenna elements, carrier aggregation (CA) in which a plurality of component carriers (CC) are used in bundles, Dual Connectivity (DC) in which communication is performed between the UE and each of two NG-RAN nodes at the same time, and the like.

The radio communication system 10 supports FR1 and FR2. A frequency band of each FR is as follows.

FR1: 410 MHz to 7.125 GHz

FR2: 24.25 GHz to 52.6 GHz

In FR1, a subcarrier spacing (SCS) of 15 kHz, 30 kHz or 60 kHz may be used, and a bandwidth (BW) of 5 to 100 MHz may be used. FR2 is a higher frequency range than FR1, and in FR 2, a SCS of 60 kHz or 120 kHz (240 kHz may be included) may be used, and a bandwidth (BW) of 50 to 400 MHz may be used.

Note that the SCS may be interpreted as numerology. The numerology is defined in 3GPP TS38.300 and corresponds to one subcarrier spacing in frequency domain.

Further, the radio communication system 10 can also support a higher frequency band than the frequency band of FR2. Specifically, the radio communication system 10 may support a frequency band beyond 52.6 GHz and up to 114.25 GHz.

Further, the high frequency band may be further divided. For example, the high frequency band may be divided into a frequency range of 71 GHz or lower and a frequency range beyond 71 GHz.

Particularly, in such a high frequency band, there is a problem such as an increase of phase noise between carriers. Therefore, application of a larger (wider) SCS or a single carrier waveform can be required.

Further, due to an increase in propagation loss, a narrower beam (that is, a larger number of beams) can be required. In addition, since it becomes more sensitive to a peak-to-average power ratio (PAPR) and nonlinearity of a power amplifier, a larger (wider) SCS (and/or fewer FFT points), a PAPR reduction mechanism, or a single carrier waveform can be required.

In order to solve such a problem, in the present embodiment, a larger SCS (for example, 480 kHz or 960 kHz) may be used particularly when using a band beyond 52.6 GHz. Furthermore, Discrete Fourier Transform-Spread Orthogonal Frequency Division Multiplexing (DFT-s-OFDM) may be more widely applied.

Further, the radio communication system 10 can support Faster-Than-Nyquist (FTN) transmission. The FTN can improve frequency utilization efficiency as compared with Nyquist rate transmission by multiplexing symbols (specifically, OFDM symbols, hereinafter, simply referred to as symbols if appropriate) at a rate higher than the Nyquist rate.

The FTN may be applied to only one of uplink (UL) and downlink (DL). However, application of the FTN to both UL and DL is not excluded.

The FTN allows inter-symbol interference (ISI) and inter-subcarrier interference (ICI) and can improve frequency utilization efficiency by multiplexing OFDM symbols with high density. Note that the frequency utilization efficiency may be simply referred to as utilization efficiency, or may be referred to as spectral efficiency (SE) or the like.

Figure 2:
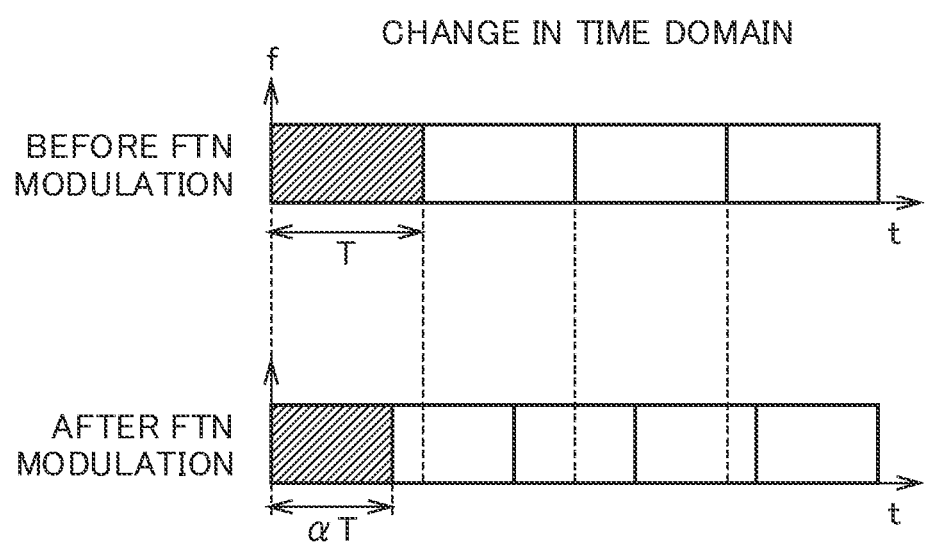
FIG. 2 is a diagram illustrating a change in time domain in a case where FTN is combined with DFT-s-OFDM.

FIG. 2 illustrates a change in time domain in a case where the FTN is combined with the DFT-s-OFDM.

A non-orthogonal subcarrier can be expressed as follows.

$$\text{Subcarrier Spacing(SCS)}(\Delta f) \times \text{OFDM Symbol}(T) = \alpha < 1 \text{ s}$$

Here, α is called an FTN modulation factor or a compression factor. Note that the compression factor may mean a time-domain compression rate based on the FTN, and may be simply referred to as a compression rate or the like. Further, the compression factor does not necessarily mean the time-domain compression rate based on the FTN, but may be a factor associated with another system other than the FTN.

Note that a waveform of the non-orthogonal subcarrier as described above may be called a non-orthogonal waveform (NOW).

As illustrated in FIG. 2, comparing before FTN modulation and after FTN modulation in the time domain, a symbol length of the OFDM symbol is scaled by the FTN modulation factor α after the FTN modulation. Further, in view of such characteristics, α may also be called a squeezing factor or the like.

Specifically, the symbol length is shorter than that before the FTN modulation. That is, the OFDM symbol is compressed in the time domain, as compared with before the FTN modulation. A degree of compression can be controlled by α.

Note that the time domain may be called a time direction or the like, and the symbol length may be called a symbol time length, a symbol length, a symbol duration, a symbol time, or the like.

As described above, the FTN is applied (FTN modulation) in the time domain, and the non-orthogonal waveform (NOW) may be expressed as follows.

DFT-s-OFDM+FTN in Time Domain

In this case, a length of a cyclic prefix (CP) is preferably set based on the compression factor (α) applied to the time domain of the NOW. Further, in order to cancel the inter-symbol interference (ISI) and the inter-subcarrier interference (ICI), it is preferable that minimum mean square error (MMSE)-ICI cancelation frequency domain equalization (FDE) with low complexity is supported.

FIG. 3 illustrates a configuration example of the CP and OFDM symbol before and after the FTN modulation (compression) in the time domain. Specifically, FIG. 3 illustrates the OFDM symbol illustrated in FIG. 2 in more detail.

As illustrated in FIG. 3, the CP length (N_CP^α) based on the compression factor α can be expressed as follows.

$$N_{CP}^{\alpha} = N_{CP}^{0}/\alpha \quad \text{[Math 1]}$$

Further, in FIG. 3, the CP length may be represented by $T_{CP}$ in view of a relationship with a symbol time ($T_U$). $T_U$ and $T_{CP}$ may each be expressed in a unit of time (for example, μ seconds).

As illustrated in FIG. 3, a symbol length including the CP before the time-domain compression based on the FTN can be expressed as follows.

$$T_u + T_{CP}(N + N_{CP}^{0} \text{samples}) \quad \text{[Math 2]}$$

Further, a symbol length including the CP after the time-domain compression based on the FTN can be expressed as follows.

$$\alpha T_u + T_{CP}\left(N + \frac{N_{CP}^{0}}{\alpha} \text{ samples}\right) \quad \text{[Math 3]}$$

(2) Functional Block Configuration of Radio Communication System

Next, a functional block configuration of the radio communication system 10 will be described. Specifically, functional block configurations of the gNB 100B and the UE 200 will be described.

Figure 4:
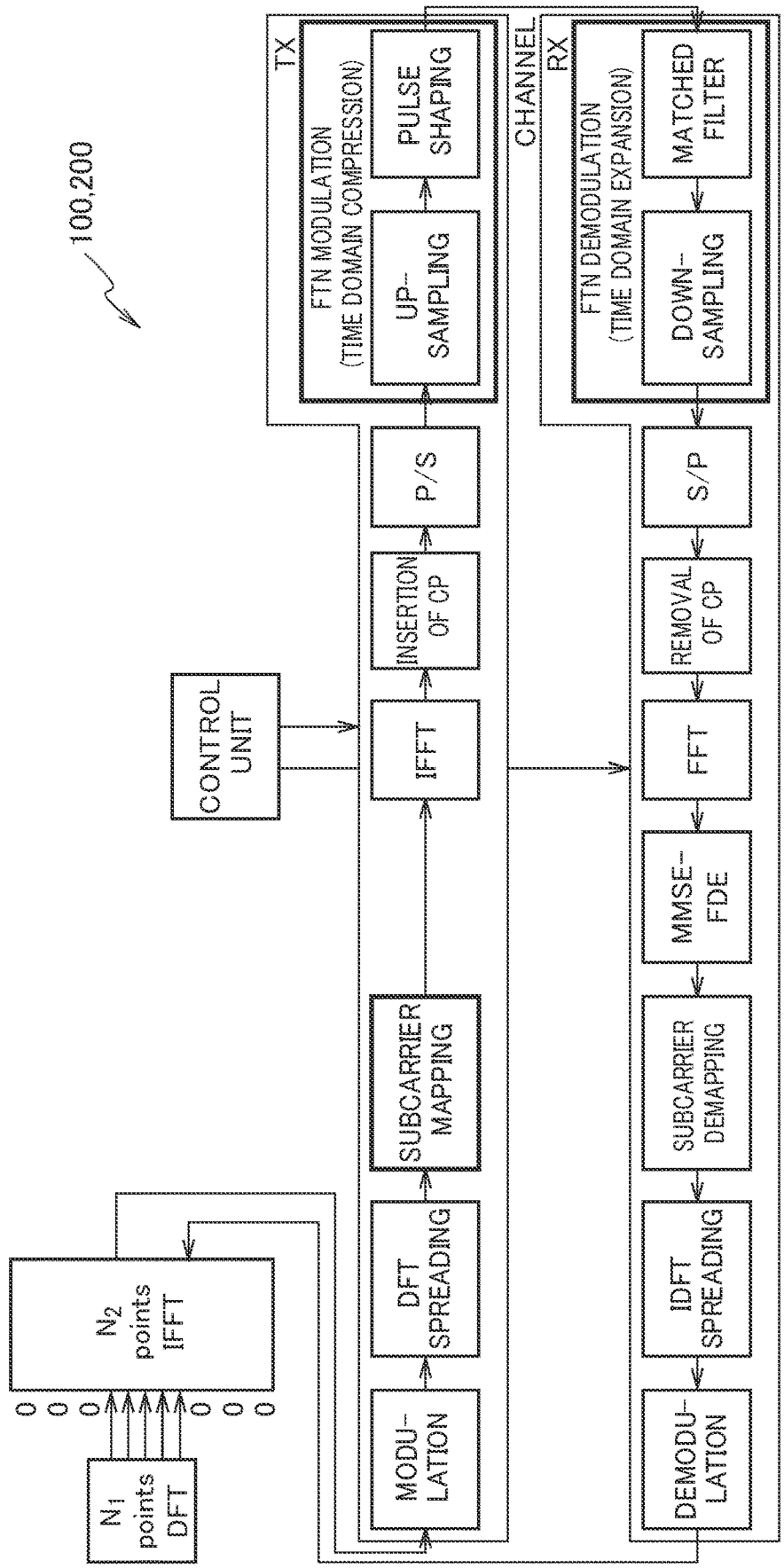
FIG. 4 is a schematic functional block configuration diagram of a gNB 100 and a UE 200.

FIG. 4 is a schematic functional block configuration diagram of a gNB 100 and a UE 200. Since the gNB 100 and the UE 200 have the same schematic functional block configuration, functional blocks of the UE 200 will be described below as an example.

As described above, in the radio communication system 10, the DFT-s-OFDM (applicable to both downlink (DL) and uplink (UL)) and the FTN are applicable.

Although a limited number of RF chains can reduce the SE, the FTN can improve the SE by using a waveform compressed (squeezed) in the time domain.

It should be noted that the schematic functional block configuration diagram illustrated in FIG. 4 mainly illustrates a part related to the FTN and the DFT-s-OFDM. In FIG. 4, functional blocks related to a transmission (TX) side and a reception (RX) side are separately illustrated.

As described above, the non-orthogonal waveform (NOW) may be interpreted as being generated by a combination of the DFT-s-OFDM and the FTN in the time domain.

Since the DFT-s-OFDM is used on the transmission side, DFT precoding (spreading) is performed after modulation using a selected modulation scheme, and subcarrier mapping is performed on symbols. A subcarrier is a sine wave with a different carrier frequency, and a phase or amplitude of each subcarrier is set according to a type of a symbol to be transmitted. Here, in consideration of application of the FTN, intensive mapping to a low-frequency subcarrier is performed.

Then, an inverse fast Fourier transform (IFFT) is performed on a plurality of symbols, and a time signal sequence is output. The plurality of input symbols are transmitted in parallel on individual subcarriers. Further, a cyclic prefix (CP) is added to an OFDM signal after the IFFT.

Further, on the transmission side, an FTN modulation module (time-domain compression module) is provided at a later stage after the addition of the CP, that is, after the DFT-s-OFDM.

The FTN modulation module multiplexes OFDM symbols at a rate higher than a Nyquist rate according to the FTN. Specifically, the FTN modulation module has a function of performing upsampling, a function of shaping a waveform after the sampling, and the like.

On the reception side, processing is performed in a reverse manner to the above-described processing on the transmission side. On the reception side, a frequency domain equalization (FDE) function (MMSE-ICI cancelation FDE) based on a minimum mean square error (MMSE) standard is implemented. As a result, frequency domain equalization based on the MMSE standard is performed, and a bit error rate (BER) characteristic can be improved.

Specifically, a combination of the DFT-s-OFDM and the FTN using the FDE can improve the SE as compared with the DFT-s-OFDM alone, at the expense of a moderate increase in signal-to-noise ratio (SNR). Further, the combination of the DFT-s-OFDM and the FTN using the FDE can achieve the same BER and SE as when CP-OFDM is used.

Further, on the reception side, an FTN demodulation module (time-domain expansion module) is provided at an early stage before removal of the CP. The FTN demodulation module has a function of a matched filter, a downsampling function, and the like.

The FTN modulation module and the FTN demodulation module transmit and receive a slot configured with a plurality of symbols (specifically, the symbols may be called OFDM symbols, or FTN symbols because the FTN is applied). In the present embodiment, the FTN modulation module and the FTN demodulation module constitute a transmitting and receiving unit.

A slot is a range (period) in the time direction (which may also be called the time domain) included in a radio frame. In the present embodiment, a slot including 14 symbols is supported, but a slot including an integer multiple of 14 symbols may also be supported.

The FTN modulation module and the FTN demodulation module may transmit and receive multiple types of radio frames with different slot patterns. The different slot patterns may mean that at least one of the number of UL symbols, DL symbols, and flexible symbols included in the radio frame, a symbol length, a slot boundary, or a symbol boundary is different.

A control unit illustrated in FIG. 4 controls the respective functional blocks constituting the transmission side and the reception side of the UE 200. Particularly, in the present embodiment, the control unit can set a length of a cyclic prefix (CP) to be added to a symbol (OFDM symbol) based on a degree of compression of the symbol in the time domain.

Specifically, the control unit can set a length of the CP based on the compression factor $\alpha$ applied to the time domain. In other words, the control unit can set a compression rate applied to the time domain of the symbol (OFDM symbol).

As described above, $\alpha$ is a value indicating the time-domain compression rate, and may basically take a value of 1.0 or less. In a case where $\alpha=1.0$, the time domain of the OFDM symbol (including the CP) is not compressed. Note that the value of $\alpha$ may be indicated by a reciprocal number or a fraction number of such a value.

In a case where a takes a value of 1.0 or less, the control unit may increase the length of the CP in accordance with the decrease of the compression factor ($\alpha$). For example, in a case where $\alpha=0.5$, the control unit may set the length of the CP to be longer than that in a case where $\alpha=1.0$.

Alternatively, the control unit may set a length of the CP associated with a minimum compression factor ($\alpha_{min}$). Specifically, even in a case where $\alpha$ takes a plurality of values less than 1.0, the control unit may set a CP length associated with the minimum $\alpha$ (for example, 0.5).

Further, the control unit can also set a compression factor associated with each of a plurality of different indicators.

The plurality of different indicators may be interpreted as target quality indicators. Specifically, the plurality of different indicators can include lossless compression, PAPR optimization, and throughput optimization. An appropriate value of $\alpha$ can vary depending on the target quality indicator.

The control unit can set a value of $\alpha$ according to the target indicator. For example, in a case where the lossless compression is the target, the control unit can set a value of $\alpha$ associated with the lossless compression. Similarly, in a case where the PAPR optimization is the target, the control unit can set a value of $\alpha$ associated with the PAPR optimization, and in a case where the throughput optimization is the target, the control unit can set a value of $\alpha$ associated with the throughput optimization.

Further, when setting the value of $\alpha$ according to such an indicator, the control unit may set a compression factor according to modulation and coding scheme (MCS). That is, the control unit can set a value of $\alpha$ according to at least one of a modulation scheme or a code rate, for each target indicator.

Specifically, the control unit can set a value of $\alpha$ associated with an MCS index. The MCS index is specified in clause 5.1.3 of 3GPP TS38.214. The MCS index can take a value of from 0 to 28. A modulation order (Qm, modulation scheme) and a code rate are specified by the value of the MCS index.

For example, the control unit can set a value of $\alpha$ associated with each of MCS indexes 0, 10, and 28. Further, the number of values of $\alpha$ associated with each MCS index may be one or plural. An example of the value of $\alpha$ associated with the MCS index will be described later.

Alternatively, when setting the value of $\alpha$ according to such an indicator, the control unit may set a compression factor based on an association between an index and the compression factor. The association may be specified for each target indicator (lossless compression, PAPR optimization, or throughput optimization).

Specifically, the control unit may determine the value of $\alpha$ based on a table in which an arbitrary index is associated with a value of $\alpha$. The table may be configured for each target indicator.

Similarly to the MCS index, the index may take a value of from 0 to 28. That is, the existing MCS index table (clause 5.1.3 of 3GPP TS38.214) may be diverted to configure a table in which an arbitrary index is associated with a value of $\alpha$.

Further, when setting the value of $\alpha$ according to such an indicator, the control unit may set the value of $\alpha$, that is, the compression factor, based on signaling from the network in a higher layer.

Specifically, the control unit can set the value of $\alpha$ based on signaling in a radio resource control layer (RRC). More specifically, an RRC parameter (which may be interpreted as an information element (IE)) for each target indicator or an RRC parameter common to a plurality of indicators may be used. Note that an example of the parameter will be described later.

Note that the UE 200 supports processing related to a specified reference signal, control signal, control channel, and data channel in order to perform radio communication according to the NR.

For example, the UE 200 performs processing using a reference signal (RS) such as a demodulation reference signal (DMRS) and a phase tracking reference signal (PTRS).

The DMRS is a known downlink (base station to terminal) terminal-specific reference signal (pilot signal) for estimation of a fading channel used for data demodulation. The PTRS is a terminal-specific reference signal for estimation of phase noise, which is a problem in high frequency bands.

Note that, in addition to the DMRS and the PTRS, the reference signal also includes a channel state information-reference signal (CSI-RS) and a sounding reference signal (SRS).

Further, the UE 200 transmits and receives a control signal such as an RRC via the control channel.

The channels include a control channel and a data channel. Examples of the control channel include a physical downlink control channel (PDCCH), a physical uplink control channel (PUCCH), a physical random access channel (PRACH), and a physical broadcast channel (PBCH).

Further, examples of the data channel include a physical downlink shared channel (PDSCH) and a physical downlink shared channel (PUSCH). Data may mean data transmitted via the data channel.

Also, the UE 200 performs transmission/reception of a protocol data unit (PDU) and a service data unit (SDU). Specifically, the UE 200 performs assembly/disassembly of the PDU/SDU in a plurality of layers (a medium access control layer (MAC), a radio link control layer (RLC), a packet data convergence protocol layer (PDCP), and the like).

(3) Operations of Radio Communication System

Next, operations of the radio communication system 10 will be described. Specifically, an operation in which the gNB 100 and the UE 200 perform time-domain compression of the OFDM symbol based on the FTN and set a CP length based on a level of the compression, and an operation of setting a compression factor ($\alpha$) associated with a target quality indicator (lossless compression, PAPR optimization, or throughput optimization) will be described.

Note that the operation of the UE 200 will be described below as an example.

(3.1) Assumption

In 5G Evolution, 6G, or the like, it is assumed that a wide bandwidth is used in a high frequency band. As described above, the FTN combined with the DFT-s-OFDM can achieve high frequency utilization efficiency (SE) and power efficiency (PE).

However, in a case where the FTN and the DFT-s-OFDM are simply combined, processing or the like becomes extremely complicated. Therefore, in order to achieve high SE and PE while reducing complexity, in the present embodiment, a non-orthogonal waveform (NOW) that is a combination of the DFT-s-OFDM and the FTN in the time domain is used. The NOW is applicable to DL and/or UL.

In order to support the NOW with reduced complexity, the CP length is preferably set based on a parameter related to the NOW, specifically, the compression factor ($\alpha$). Further, it is preferable to set the compression factor ($\alpha$) according to different target quality indicators.

Figure 5:
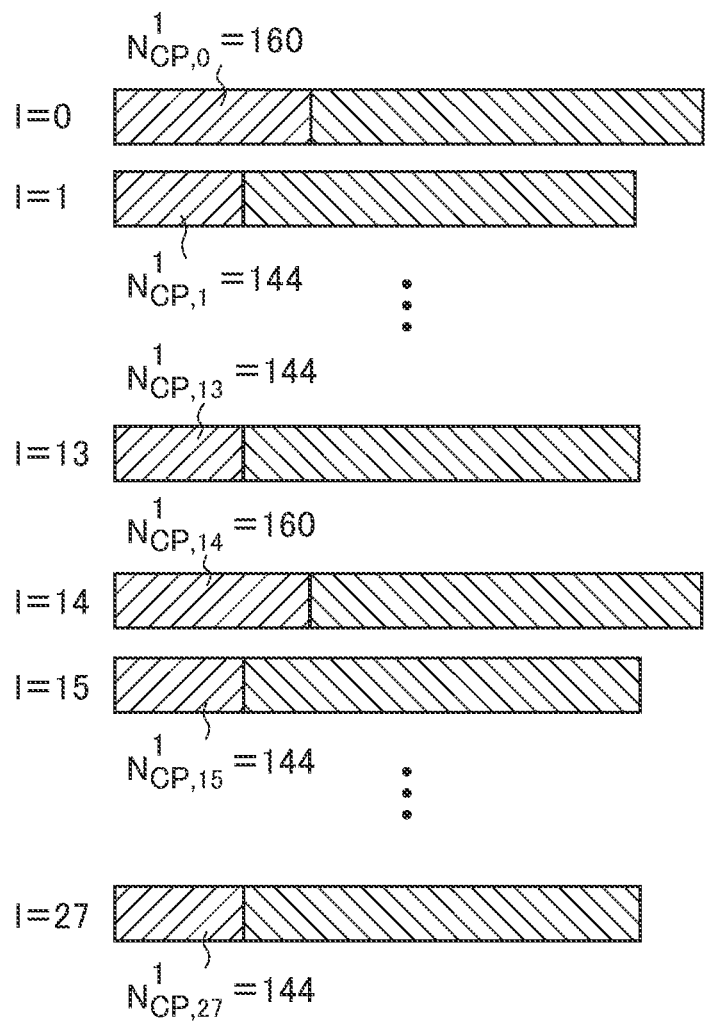
FIG. 5 is a diagram illustrating a configuration example of a normal CP and OFDM symbol, in which the FTN is not applied in the time domain.

FIG. 5 illustrates a configuration example of a normal CP and OFDM symbol, in which the FTN is not applied in the time domain. Financially, the CP is used to cancel ISI caused by a multipath delay. The CP length is determined based on an FFT size, an SCS, and an OFDM symbol index. Note that an extended CP is supported only in a case where the SCS is 60 kHz.

The CP length can be expressed as follows.

[Math 4]

$$N^{\mu}_{CP,l} = \begin{cases} 512\kappa \cdot 2^{-\mu} & \text{extended cyclic prefix} \\ 144\kappa \cdot 2^{-\mu} + 16\kappa \cdot 2^{-\mu} & \text{normal cyclic prefix, } l = 0 \text{ or } l = 7 \cdot 2^{\mu} \\ 144\kappa \cdot 2^{-\mu} & \text{normal cyclic prefix, } l \neq 0 \text{ and } l \neq 7 \cdot 2^{\mu} \end{cases}$$

FIG. 5 illustrates a configuration example of the CP and OFDM symbol in a case where $\Delta f=30$ kHz and FFT size N_f=2048. "l" of N_CP, $l^\wedge\mu$ means an OFDM symbol index. l can take a value of from 0 to 27.

As illustrated in FIG. 5, in a case where OFDM symbol index (l)=0 or 14, the CP length is 160 samples. Further, in a case where OFDM symbol index (l)≠0 or 14, the CP length is 144 samples.

In 3GPP Releases 15 and 16(NR), use of an orthogonal waveform is assumed, and the NOW is not supported. In the following, an operation of setting the CP length based on the time-domain compression rate of the OFDM symbol (which may also be read as a slot) and an operation of setting the compression factor ($\alpha$) according to different target quality indicators will be described.

(3.2) Overview of Operations

Operation Example 1 relates to setting of the CP length based on the time-domain compression rate of the OFDM symbol while using the NOW.

Further, Operation Example 2 relates to setting of the compression factor ($\alpha$) according to different target quality indicators.

Specifically, Operation Example 1 and Operation Example 2 are configured as follows.

Operation Example 1

(Operation Example 1-1): The CP length is set based not only on the FFT size, the SCS, and the (time domain) OFDM symbol index, but also on the compression factor ($\alpha$).

(Operation Example 1-2): CP length setting operation (Operation example 1-2-1): CP length setting based on compression factor ($\alpha$)

(Operation example 1-2-2): Setting of individual CP length using RRC layer

Operation Example 2

(Operation Example 2-1): Definition of new table that includes different target quality indicators (Operation Example 2-2): Definition of new table for each of different target quality indicators (Operation Example 2-3): Setting of value of $\alpha$ using RRC layer parameter By such Operation Example 1 or Operation Example 2, a receiving device (UE or gNB) that can cancel ISI and ICI and reduce complexity can be configured. Further, higher SE and PE can be achieved as compared with a case of using the orthogonal waveform.

Note that contents of clause 5.3.1 of 3GPP TS38.211, which specifies the CP length, may be reviewed. For example, a new table related to the compression factor ($\alpha$) may be specified. Further, new signaling in the RRC layer or the like may be specified.

(3.3) Operation Example 1

In this operation example, the CP length is set based on the compression factor ($\alpha$) as well. In a case of the NOW, the CP has the following two functions.

Cancellation of ISI caused by a multipath delay

Cancellation of ISI caused by time-domain compression of the FTN (new function unique to the NOW)

(3.3.1) Operation Example 1-1

In this operation example, the CP length is set based not only on the FFT size, the SCS, and the (time domain) OFDM symbol index, but also on the compression factor ($\alpha$). In a case where $\alpha=1$, there may be an option as to whether or not to consider influence of a pulse shaping filter on the setting of the CP length.

Specifically, Options 1 and 2 as follows are listed.

(Option 1): CP Length Setting Considering Influence of Pulse Shaping Filter

In this case, the CP length can be calculated as follows.

$$N_{CP,l}^{\mu,1} = N_{CP1,l}^{\mu,1} + N_{CP2,l}^{\mu,1} \quad [\text{Math 5}]$$

(Option 2): CP Length Setting without Considering Influence of Pulse Shaping Filter In this case, the CP length can be calculated as follows.

$$N_{CP,l}^{\mu,1} = N_{CP1,l}^{\mu,1} \quad [\text{Math 6}]$$

Figure 6:
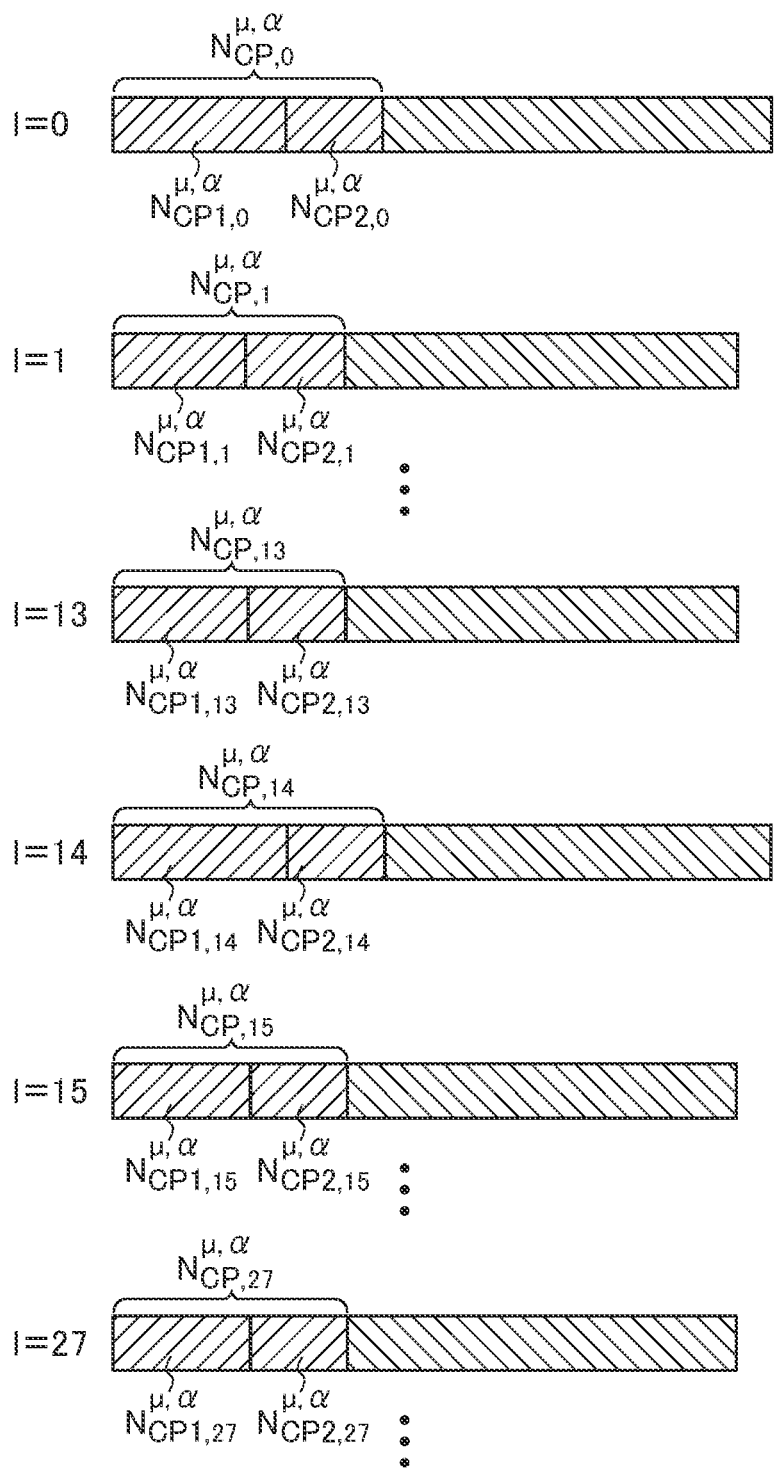
FIG. 6 is a diagram illustrating a basic configuration example of a CP and OFDM symbol according to Operation Example 1-1.

FIG. 6 illustrates a basic configuration example of a CP and OFDM symbol according to Operation Example 1-1. Further, in this operation example, the CP length can be expressed as follows.

$$N_{CP,l}^{\mu,\alpha} = \begin{cases} N_{CP1,l}^{\mu,\alpha} & \text{influence of pulse is not considered} \\ N_{CP1,l}^{\mu,\alpha} + N_{CP2,l}^{\mu,\alpha} & \text{others} \end{cases} \quad [\text{Math 7}]$$

$$N_{CP1,l}^{\mu,\alpha} = \lceil N_{CP1,l}^{\mu,1}/\alpha \rceil,$$

$$N_{CP1,l}^{\mu,1} = \begin{cases} 512\kappa \cdot 2^{-\mu} & \text{extended cyclic prefix} \\ 144\kappa \cdot 2^{-\mu} + 16\kappa \cdot 2^{-\mu} & \text{normal cyclic prefix, } l = 0 \text{ or } l = 7 \cdot 2^{\mu} \\ 144\kappa \cdot 2^{-\mu} & \text{normal cyclic prefix, } l \ne 0 \text{ and } l \ne 7 \cdot 2^{\mu} \end{cases}$$

$$N_{CP2,l}^{\mu,\alpha} = \lceil N_{CP2,l}^{\mu,1}/\alpha \rceil, N_{CP2,l}^{\mu,1} = 2L, L = 0, 2, \ldots, 2n$$

Here, L=0, 2, . . . , 2n may mean a truncated length from both the front side and the rear side of the pulse shaping filter of the NOW.

Further, in 5G Evolution or 6G, since there is a possibility that a larger SCS is supported, a larger SCS (µ) may be provided.

Figure 7:
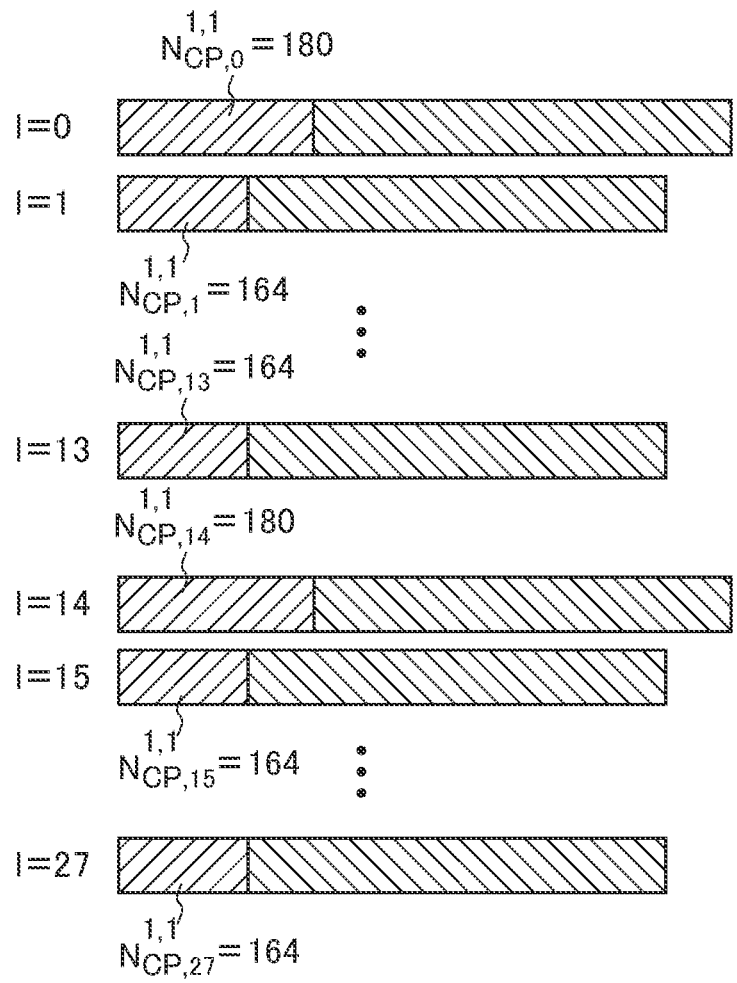
FIG. 7 is a diagram illustrating a configuration example ($\alpha$=1, Option 1) of the CP and OFDM symbol according to Operation Example 1-1.

FIG. 7 illustrates a configuration example ($\alpha$=1, Option 1) of the CP and OFDM symbol according to Operation Example 1-1. Further, FIG. 8 illustrates a configuration example ($\alpha$=1, Option 2) of the CP and OFDM symbol according to Operation Example 1-1.

Figure 8:
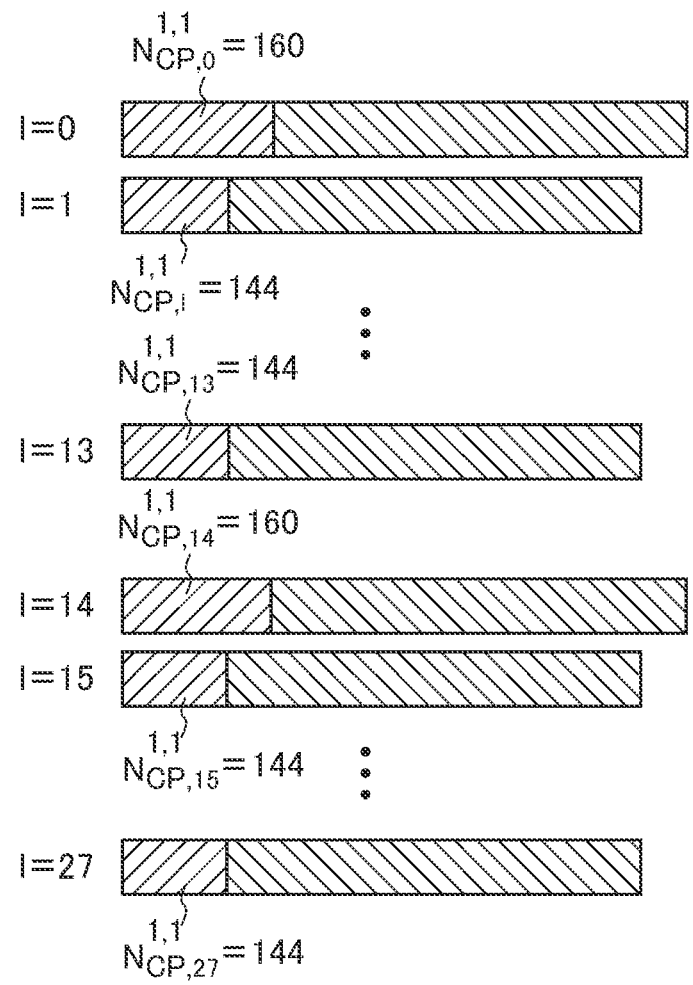
FIG. 8 is a diagram illustrating a configuration example ($\alpha$=1, Option 2) of the CP and OFDM symbol according to Operation Example 1-1.

FIGS. 7 and 8 illustrate configuration examples in a case where SCS $\Delta$f=30 kHz, FFT size N_f=2048, and L=10, L being a truncated length from both the front side and the rear side of the pulse shaping filter of the NOW. Relevant mathematical formulas can be expressed as follows.

$$\mu = 1, l \in \{0, 1, \ldots, 27\}, \quad [\text{Math 8}]$$

$$\kappa = \frac{T_s}{T_c} = \frac{\Delta f \cdot N_f}{\Delta f_{ref} \cdot N_{f,ref}} = 2, N_{CP2,l}^{1,1} = 2L = 20$$

As illustrated in FIGS. 7 and 8, the CP length is different between Option 1 and Option 2. Specifically, the CP length in Option 1 is longer than the CP length in Option 2.

Figure 9:
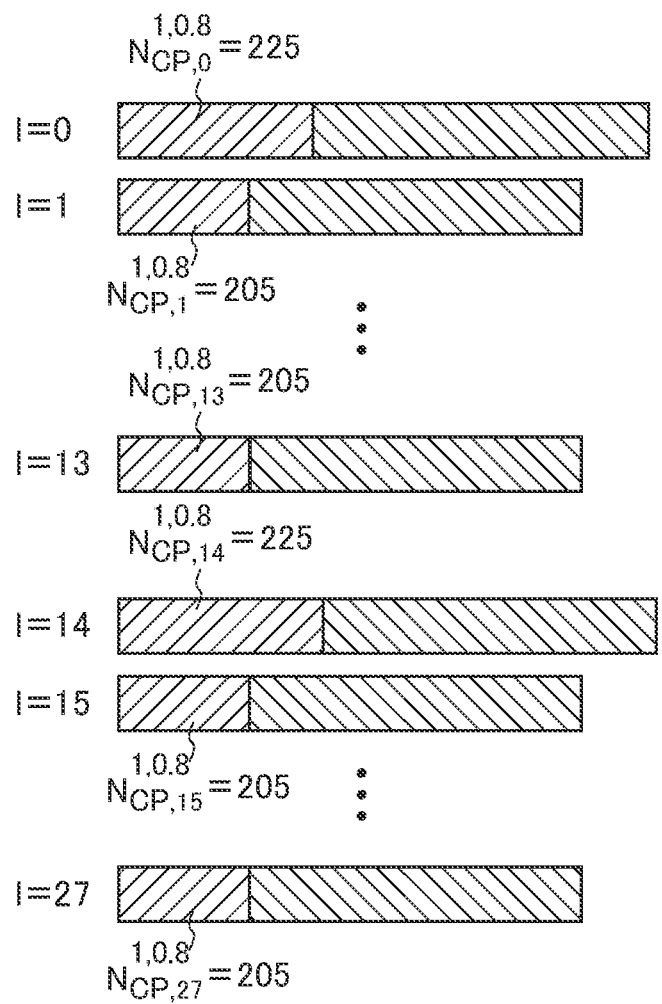
FIG. 9 is a diagram illustrating a configuration example ($\alpha$=0.8) of the CP and OFDM symbol according to Operation Example 1-1.
Figure 10:
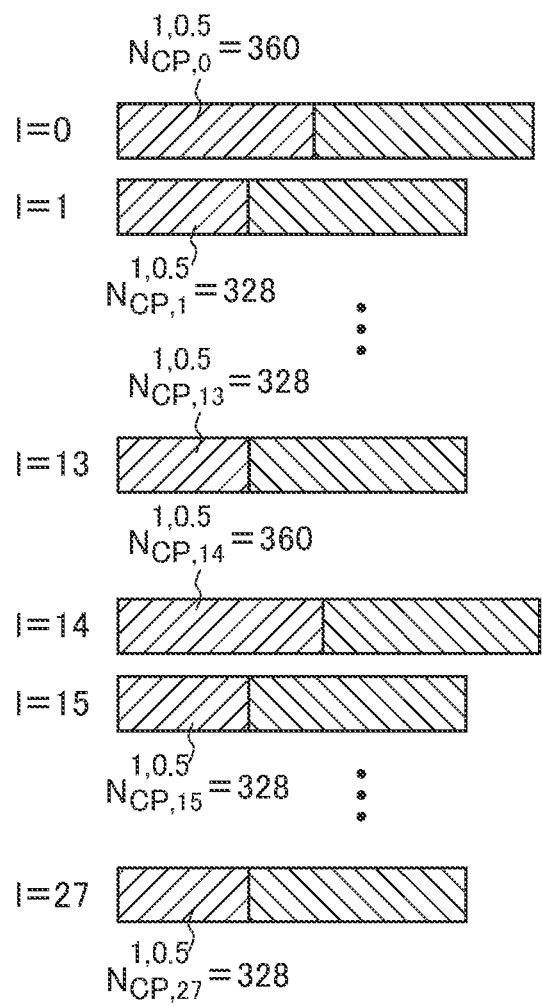
FIG. 10 is a diagram illustrating a configuration example ($\alpha$=0.5) of the CP and OFDM symbol according to Operation Example 1-1.

FIG. 9 illustrates a configuration example ($\alpha$=0.8) of the CP and OFDM symbol according to Operation Example 1-1. Further, FIG. 10 illustrates a configuration example ($\alpha$=0.5) of the CP and OFDM symbol according to Operation Example 1-1. Note that the SCS, the FFT size, and the like are the same as those in the configuration examples illustrated in FIGS. 7 and 8.

As illustrated in FIGS. 9 and 10, the CP length may be increased as the value of $\alpha$ is decreased (that is, as the compression rate is increased). Specifically, the CP length in a case where $\alpha$=0.5 is longer than the CP length in a case where $\alpha$=0.8.

(3.3.2) Operation Example 1-2

In this operation example, the CP length is set by an implicit or explicit notification. Specifically, the CP length may be implicitly set according to the compression factor ($\alpha$) (Operation Example 1-2-1). In this case, $\alpha$ may be a fixed value specified in advance in the 3GPP specifications, or may be set using the RRC or downlink control information (DCI).

Alternatively, the CP length may be explicitly set using the RRC (Operation Example 1-2-2). In this case, the following options may be set.

(Option 1): The CP length is set using the RRC based on a minimum compression factor $\alpha_{min}$.

In this case, $\alpha$ new RRC parameter (or an information element (IE) or a field constituting the IE), for example, NOW-minCompressionFactor, may be introduced to indicate $\alpha_{min}$.

Further, only one $\alpha_{min}$ may be set, or a plurality of $\alpha_{min}$ may be set. In a case where only one $\alpha_{min}$ is set, all a may belong to the same set.

On the other hand, when a plurality of $\alpha_{min}$ are set and a plurality of $\alpha$ belong to different sets, $\alpha_{min}$ corresponding to each set may be set. Alternatively, when a belongs to a certain set among a plurality of sets, $\alpha_{min}$ corresponding to the set may be used.

(Option 2): The CP length is set using the RRC based on the compression factor $\alpha$.

In this case, $\alpha$ new RRC parameter (or an information element (IE) or a field constituting the IE), for example, NOW-CompressionFactor, may be introduced to indicate $\alpha$.

Figure 11A:
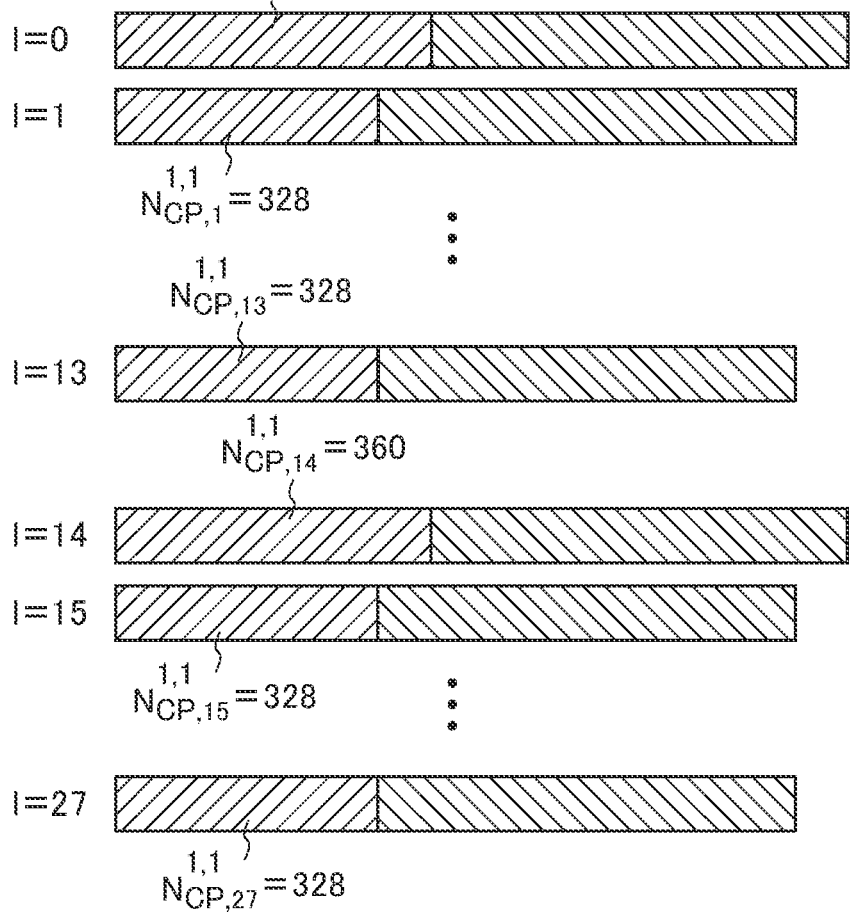
FIG. 11A is a diagram illustrating a configuration example (part 1, $\alpha$=1) of a CP and OFDM symbol according to Operation Example 1-2-2.

FIGS. 11A, 11B, and 11C illustrate configuration examples (part 1) of the CP and OFDM symbol according to Operation Example 1-2-2. FIGS. 11A, 11B, and 11C correspond to a case where $\alpha$=1, a case where $\alpha$=0.8, and a case where $\alpha$=0.5, respectively. FIGS. 11A, 11B, and 11C correspond to Option 1 described above, and illustrate configuration examples in a case where only one $\alpha_{min}$ is set.

Specifically, as illustrated in FIGS. 11A, 11B, and 11C, $\alpha$ can take values of 1, 0.8, and 0.5, and among these, a minimum $\alpha$, that is, $\alpha$ of 0.5 is set as $\alpha_{min}$ ({$\alpha$=1, 0.8, 0.5}∈ E $\alpha_{min}$=0.5). Therefore, as a result, $\alpha$ of 0.5 is applied to all, and the same CP length is set.

FIGS. 12A, 12B, and 12C illustrate configuration examples (part 2) of the CP and OFDM symbol according to Operation Example 1-2-2. FIGS. 12A, 12B, and 12C correspond to a case where $\alpha$=1, a case where $\alpha$=0.8, and a case where $\alpha$=0.5, respectively. FIGS. 12A, 12B, and 12C correspond to Option 1 described above, and illustrate configuration examples in a case where only a plurality of $\alpha_{min}$ are set.

Specifically, as illustrated in FIGS. 12A, 12B, and 12C, $\alpha$ can take values of 1, 0.8, and 0.5, and among these, two smaller $\alpha$ are set as $\alpha_{min1}$ and $\alpha_{min2}$ ({$\alpha$=1, 0.8}∈ $\alpha_{min1}$=0.8; {$\alpha$=0.5}∈ $\alpha_{min2}$=0.5). Therefore, $\alpha_{min1}$ of 0.8 is applied to a case where $\alpha$=1 (FIG. 12A).

Note that, in this operation example as well, the SCS, the FFT size, and the like are the same as those of the configuration examples illustrated in FIGS. 7 and 8.

(3.4) Operation Example 2

In this operation example, the compression factor ($\alpha$) is set according to different target quality indicators. Specifically, as described above, $\alpha$ is set according to the indicator of the lossless compression, the PAPR optimization, or the throughput optimization.

Note that the lossless compression may be interpreted as aiming at time-domain compression while preventing a portion from being cut by the pulse shaping filter. Further, from the perspective of the UE 200, it is preferable that the PAPR is low. Therefore, the PAPR optimization may be interpreted as aiming at a reduction of the PAPR.

The throughput optimization may be interpreted as aiming at improvement of a throughput (transmission rate) by setting a smaller α while ensuring a low BER.

Figure 13:
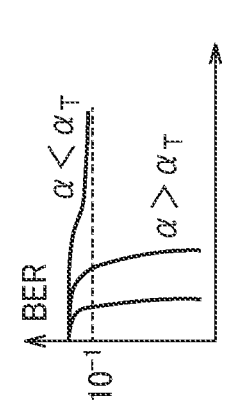
FIG. 13 is a diagram illustrating an example of a combination of a target indicator, modulation and coding scheme (MCS), and a compression factor (α) according to Operation Example 2.

FIG. 13 illustrates an example of a combination of a target indicator, MCS, and a compression factor (α) according to Operation Example 2. As illustrated in FIG. 13, a method of calculating α may be different for each target quality indicator.

Further, the method of calculating α may be different depending on the MCS, specifically, a modulation scheme (QPSK, 16QAM, or 64QAM) and/or a code rate (CR).

(3.4.1) Operation Example 2-1

In this operation example, a new table that includes different target quality indicators is defined. FIGS. 14, 15 and 16 illustrate examples of a table for a compression factor (α) according to Operation Example 2-1. Specifically, the tables illustrated in FIGS. 14, 15, and 16 correspond to MCS 0, MCS 10, and MCS 28 (MCS indexes), respectively.

As illustrated in FIGS. 14, 15 and 16, a table which is associated with the MCS index and in which a plurality of different values of α are specified may be used. Further, different values of α corresponding to the indicator of the lossless compression, the PAPR optimization, and the throughput optimization, respectively, may be set according to the MCS. Furthermore, a value (0.9, 0.8, 0.75, or the like) of α other than that for the indicator may be set.

In addition, a new field (for example, CompressionFactor scaling) may be provided in the DCI to notify of the compression factor (α).

(3.4.2) Operation Example 2-2

In this operation example, a new table is defined for each different target quality indicator. FIGS. 17, 18, and 19 illustrate examples of a table for a compression factor (α) according to Operation Example 2-2. Specifically, the tables illustrated in FIGS. 17, 18 and 19 correspond to the lossless compression, the PAPR optimization, and the throughput optimization, respectively.

As illustrated in FIGS. 17, 18, and 19, a table which is associated with a target indicator and in which a plurality of different values of α are specified may be used.

Further, in order to notify of the compression factor (α) for each target indicator, a new field (for example, CompressionFactorLossless scaling, CompressionFactorPapr scaling, or CompressionFactorThroughput scaling) may be provided in the DCI.

(3.4.3) Operation Example 2-3

In this operation example, a value of α is set using the RRC layer parameter. Specifically, the following options may be set.
(Option 1): A new RRC layer parameter (for example, NOW-CompressionFactorSet) is introduced, and one value of α is specified for the target indicator.
In this case, when the parameter is not set, the UE 200 may assume a default value (for example, 1).

(Option 2): Three new RRC layer parameters (for example, NOW-CompressionFactorLosslessSet, NOW-CompressionFactorPaprSet, and NOW-CompressionFactorThroughputSet) are introduced, and three values of α corresponding to the target indicators, respectively, are specified.
Also in this case, when the parameter is not set, the UE 200 may assume a default value (for example, 1).

(4) Actions/Effects

According to the above-described embodiment, the following effects can be obtained. Specifically, the UE 200 can set a length of a cyclic prefix (CP) to be added to a symbol (OFDM symbol) based on a degree of compression of the symbol in the time domain.

Therefore, even in a case where the FTN in the time domain and the DFT-s-OFDM are combined, an appropriate CP based on the degree of compression can be set.

In the present embodiment, the UE 200 can set the CP length based on a compression factor α applied to the time domain. Therefore, an appropriate CP length based on a time-domain compression rate based on the FTN or the like can be set quickly and easily.

In the present embodiment, the UE 200 can lengthen the CP as the compression factor (α) is decreased. Therefore, stable symbol reception can be continued even in a case where the time-domain compression rate is high.

In the present embodiment, the UE 200 can set a CP length associated with a minimum compression factor ($\alpha_{min}$). Therefore, even in a case where a plurality of α are used, reception of symbols can be more reliably continued.

In addition, the UE 200 can also set a compression factor associated with each of a plurality of different target indicators (the lossless compression, the PAPR optimization, and the throughput optimization).

Therefore, it is possible to set an appropriate time-domain compression rate according to an indicator to be optimized.

In the present embodiment, the UE 200 can set a value of α according to at least one of a modulation scheme or a code rate, for each target indicator. Therefore, an appropriate compression factor (α) can be set according to a combination of the target indicator and the MCS.

In the present embodiment, when setting the value of α according to such an indicator, the UE 200 can set a compression factor based on an association between an arbitrary index or the same index as the MCS index, and the compression factor. Therefore, for example, it is possible to flexibly set the compression factor while following the same configuration as the MCS index.

In the present embodiment, when setting the value of α according to such an indicator, the UE 200 can set the value of α, that is, the compression factor, based on signaling from the network in a higher layer (the RRC or the like). Therefore, an appropriate value of α can be set by the initiative of the network.

(5) Other Embodiments

Although the embodiment has been described, the present invention is not limited to the description of the embodiment, and it is obvious to those skilled in the art that various modifications and improvements can be made.

For example, in the above-described embodiment, an example in which the time-domain compression factor changes by the FTN has been described, but such a time-domain compression factor may not necessarily be based on the FTN. That is, the time-domain compression factor (compression rate) may be simply specified regardless of the modulation scheme such as the FTN.

In the above-described embodiment, an example in which the FTN in the time domain and the DFT-s-OFDM are combined has been described, but such a combination is not always necessary.

Moreover, the block diagram (FIG. 4) used for describing the embodiments illustrates blocks of functional unit. Those functional blocks (structural components) are realized by a desired combination of at least one of hardware and software. A method for realizing each functional block is not particularly limited. That is, each functional block may be realized by one device combined physically or logically. Alternatively, two or more devices separated physically or logically may be directly or indirectly (for example, wiredly or wirelessly) connected to each other, and each functional block may be realized by these plural devices. The functional blocks may be realized by combining software with the one device or the plural devices mentioned above.

Functions include determining, judging, calculating, computing, processing, deriving, investigating, searching, ascertaining, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (structural component) that causes transmitting is called a transmitting unit or a transmitter. For any of the above, as described above, the realization method is not particularly limited to any one method.

Figure 20:
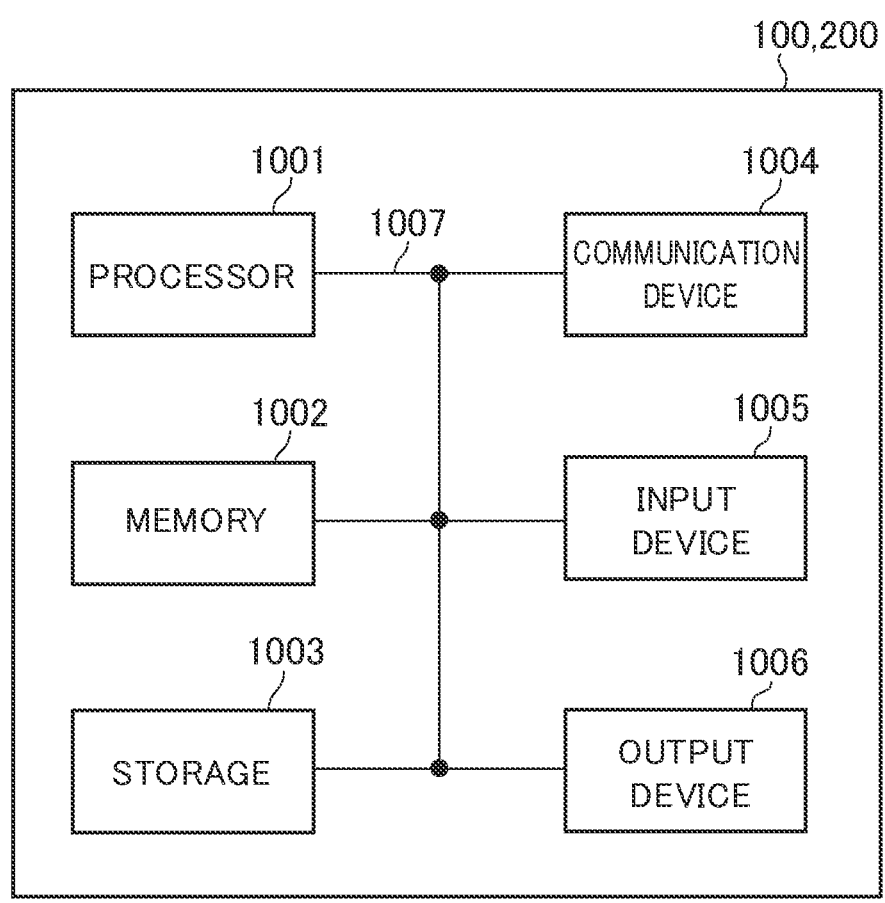
FIG. 20 is a diagram illustrating an example of a hardware configuration of the UE 200.

Furthermore, the UE 200 described above may function as a computer that performs the processing of the radio communication method of the present disclosure. FIG. 20 is a diagram illustrating an example of a hardware configuration of the UE 200. As illustrated in FIG. 20, the UE 200 may be configured as a computer device including a processor 1001, a memory 1002, a storage 1003, a communication device 1004, an input device 1005, an output device 1006, a bus 1007, and the like.

Furthermore, in the following description, the term "device" can be replaced with a term such as "circuit", "device", or "unit". A hardware configuration of the device may be constituted by including one or plurality of the devices illustrated in the figure, or may be constituted without including some of the devices.

Each functional block (see FIG. 4) of the UE 200 is realized by any of hardware elements of the computer device or a desired combination of the hardware elements.

Moreover, the processor 1001 performs operation by loading predetermined software (program) on hardware such as the processor 1001 and the memory 1002, controls communication via the communication device 1004, and controls at least one of reading and writing of data on the memory 1002 and the storage 1003, thereby realizing various functions of the UE 200.

The processor 1001, for example, operates an operating system to control the entire computer. The processor 1001 may be configured with a central processing unit (CPU) including an interface with a peripheral device, a control device, an operation device, a register, and the like.

Moreover, the processor 1001 reads a program (program code), a software module, data, and the like from at least one of the storage 1003 and the communication device 1004 into the memory 1002, and performs various processing according to the data. As the program, a program that is capable of executing on the computer at least a part of the operation described in the above embodiments is used. Alternatively, various processing described above may be performed by one processor 1001 or may be performed simultaneously or sequentially by two or more processors 1001. The processor 1001 may be implemented by using one or more chips. Alternatively, the program may be transmitted from a network via a telecommunication line.

The memory 1002 is a computer readable recording medium and may be configured, for example, with at least one of Read Only Memory (ROM), Erasable Programmable ROM (EPROM), Electrically Erasable Programmable ROM (EEPROM), Random Access Memory (RAM), and the like. The memory 1002 may be called register, cache, main memory (main storage device), and the like. The memory 1002 can store therein a program (program codes), software modules, and the like that can execute the method according to the embodiment of the present disclosure.

The storage 1003 is a computer readable recording medium. Examples of the storage 1003 include at least one of an optical disk such as Compact Disc ROM (CD-ROM), a hard disk drive, a flexible disk, a magneto-optical disk (for example, a compact disk, a digital versatile disk, or a Blu-ray (Registered Trademark) disk), a smart card, a flash memory (for example, a card, a stick, or a key drive), a floppy (Registered Trademark) disk, a magnetic strip, and the like. The storage 1003 may be called an auxiliary storage device. The recording medium may be, for example, a database including at least one of the memory 1002 and the storage 1003, a server, or other appropriate media.

The communication device 1004 is hardware (transmission/reception device) capable of performing communication between computers via at least one of a wired network and radio network. The communication device 1004 is also called, for example, a network device, a network controller, a network card, a communication module, or the like.

The communication device 1004 may include a radio-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information thereamong. The bus 1007 may be constituted by a single bus or may be constituted by separate buses between the devices.

Further, the device may be configured to include hardware such as a microprocessor, a Digital Signal Processor (DSP), an Application Specific Integrated Circuit (ASIC), a Programmable Logic Device (PLD), and a Field Programmable Gate Array (FPGA). Some or all of these functional blocks may be realized by the hardware. For example, the processor 1001 may be implemented by using at least one of these kinds of hardware.

Notification of information is not limited to that described in the above aspect/embodiment, and may be performed by using a different method. For example, the notification of information may be performed by physical layer signaling (for example, Downlink Control Information (DCI), Uplink Control Information (UCI), higher layer signaling (for example, RRC signaling, Medium Access Control (MAC) signaling, broadcast information (Master Information Block (MIB) and System Information Block (SIB)), other signals, or a combination thereof. The RRC signaling may be called RRC message, and may be, for example, an RRC Connection Setup message or an RRC Connection Reconfiguration message.

Each of the above aspects/embodiments may be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods described above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal can be performed by at least one of the base station and other network nodes other than the base station (for example, MME, S-GW, and the like may be considered, but not limited thereto). In the above, an example in which there is one network node other than the base station is described; however, a combination of a plurality of other network nodes (for example, MME and S-GW) may be used.

Information and signals (information and the like) can be output from a higher layer (or lower layer) to a lower layer (or higher layer). It may be input and output via a plurality of network nodes.

The input/output information may be stored in a specific location (for example, a memory) or may be managed in a management table. The information to be input/output can be overwritten, updated, or added. The information may be deleted after outputting. The inputted information may be transmitted to another device.

The determination may be made by a value (0 or 1) represented by one bit or by a Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, and it may be performed implicitly (for example, without notifying the predetermined information).

Instead of being referred to as software, firmware, middleware, microcode, hardware description language, or some other names, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when software is transmitted from a website, a server, or some other remote sources by using at least one of a wired technology (coaxial cable, optical fiber cable, twisted pair, Digital Subscriber Line (DSL), or the like) and a radio technology (infrared light, microwave, or the like), at least one of these wired technology and radio technology is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in the present disclosure and terms necessary for understanding the present disclosure may be replaced by terms having the same or similar meanings. For example, at least one of a channel and a symbol may be a signal (signaling). Also, a signal may be a message. Further, a component carrier (CC) may be referred to as a carrier frequency, a cell, a frequency carrier, or the like.

The terms "system" and "network" used in the present disclosure are used interchangeably.

Furthermore, the information, the parameter, and the like described in the present disclosure may be represented by an absolute value, may be expressed as a relative value from a predetermined value, or may be represented by corresponding other information. For example, the radio resource may be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information elements can be identified by any suitable name, the various names assigned to these various channels and information elements shall not be restricted in any way.

In the present disclosure, it is assumed that "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, a communication service can be provided by a base station subsystem (for example, a small base station for indoor use (Remote Radio Head: RRH)).

The term "cell" or "sector" refers to a part or all of the coverage area of at least one of a base station and a base station subsystem that performs the communication service in this coverage.

In the present disclosure, the terms "mobile station (MS)", "user terminal", "user equipment (UE)", "terminal" and the like can be used interchangeably.

The mobile station may be called by those skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable terms.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), or a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter, the same applies). For example, each of the aspects/embodiments of the present disclosure may be applied to a configuration that allows communication between a base station and a mobile station to be replaced with communication between a plurality of mobile stations (which may be referred to as, for example, Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms such as an uplink channel, a downlink channel, or the like may be read as a side channel.

Likewise, a mobile station in the present disclosure may be read as a base station. In this case, the base station may have the function of the mobile station.

A radio frame may be configured with one or more frames in time domain. Each of one or more frames in the time domain may also be referred to as a subframe. The subframe may be configured with one or more slots in the time domain. The subframe may be a fixed time length (for example, 1 ms) that does not depend on numerology.

The numerology may be a communication parameter applied to at least one of transmission or reception of a certain signal or channel. The numerology may represent, for example, at least one of a subcarrier spacing (SCS), a bandwidth, a symbol length, a cyclic prefix length, a Transmission Time Interval (TTI), the number of symbols per TTI, a radio frame configuration, specific filtering processing performed by a transceiver in frequency domain, or specific windowing processing performed by the transceiver in the time domain.

The slot may be configured with one or more symbols (Orthogonal Frequency Division Multiplexing (OFDM) symbols, Single Carrier Frequency Division Multiple Access (SC-FDMA) symbols, and the like) in the time domain. The slot may be a unit of time based on the numerology.

The slot may include a plurality of minislots. Each minislot may be configured with one or more symbols in the time domain. Further, the minislot may also be called a subslot. The minislot may be configured with fewer symbols than those of slots. A PDSCH (or PUSCH) transmitted in a time unit larger than the minislot may be called a PDSCH (or PUSCH) mapping type A. A PDSCH (or PUSCH) transmitted using the minislot may be called a PDSCH (or PUSCH) mapping type B.

Each of the radio frame, subframe, slot, minislot, and symbol represents a time unit for transmitting a signal. Different names may be used for the radio frame, subframe, slot, minislot, and symbol, respectively.

For example, one subframe may be called a transmission time interval (TTI), a plurality of consecutive subframes may be called a TTI, and one slot or one minislot may be called a TTI. That is, at least one of the subframe or the TTI may be a subframe (1 ms) in the existing LTE, a period shorter than 1 ms (for example, 1 to 13 symbols), or a period longer than 1 ms. Note that a unit representing the TTI may also be called a slot, a minislot, or the like, instead of a subframe.

Here, the TTI refers to a minimum time unit of scheduling in radio communication, for example. For example, in the LTE system, a base station performs scheduling to allocate radio resources (frequency bandwidth, transmission power, or the like that can be used in each user terminal) to each user terminal in units of TTI. Note that the definition of the TTI is not limited thereto.

The TTI may be a transmission time unit such as a channel-coded data packet (transport block), a code block, or a codeword, or may be a processing unit such as scheduling or link adaptation. Note that, when a TTI is given, a time interval (for example, the number of symbols) in which a transport block, a code block, a codeword, or the like is actually mapped may be shorter than the TTI.

Note that, in a case where one slot or one minislot is called a TTI, one or more TTIs (that is, one or more slots or one or more minislots) may be a minimum time unit of scheduling. Further, the number of slots (the number of minislots) constituting the minimum time unit of the scheduling may be controlled.

A TTI having a time length of 1 ms may be called a normal TTI (TTI in LTE Rel. 8 to 12), a normal TTI, a long TTI, a normal subframe, a long subframe, a slot, or the like. A TTI shorter than the normal TTI may be called a short TTI, a partial TTI (a partial or fractional TTI), a short subframe, a short subframe, a minislot, a subslot, a slot, or the like.

Note that the long TTI (for example, the normal TTI or the subframe) may be read as a TTI having a time length exceeding 1 ms, and the short TTI (for example, the short TTI or the like) may be read as a TTI having a TTI length of less than the TTI length of the long TTI and equal to or more than 1 ms.

The resource block (RB) is a resource allocation unit in the time domain and the frequency domain, and may include one or a plurality of consecutive subcarriers in the frequency domain. The number of subcarriers included in the RB may be the same regardless of the numerology, for example, twelve. The number of subcarriers included in the RB may be determined based on the numerology.

Further, the time domain of the RB may include one or a plurality of symbols, and may have a length of one slot, one minislot, one subframe, or one TTI. One TTI, one subframe, or the like may be configured with one or a plurality of resource blocks.

Note that one or a plurality of RBs may also be called physical resource blocks (Physical RB: PRB), subcarrier groups (SCG), resource element groups (REG), PRB pairs, RB pairs, or the like.

Further, the resource block may also be configured with one or a plurality of resource elements (RE). For example, one RE may be a radio resource region of one subcarrier and one symbol.

The bandwidth part (BWP) (which may also be called a partial bandwidth, or the like) may represent a certain subset of continuous common resource blocks (RBs) for the numerology in a certain carrier. Here, the common RB may be specified by an RB index based on a common reference point of the carrier. The PRB may be defined in a certain BWP and numbered within the BWP.

The BWP may include a BWP (UL BWP) for UL and a BWP (DL BWP) for DL. One or a plurality of BWPs may be configured in one carrier for a UE.

At least one of the configured BWPs may be active, and the UE does not have to expect to transmit and receive a predetermined signal/channel outside the active BWP. Note that "cell", "carrier", and the like in the present disclosure may be read as "BWP".

The above-described structures such as a radio frame, a subframe, a slot, a minislot, and a symbol are merely examples. For example, the configuration such as the number of subframes included in a radio frame, the number of slots per subframe or radio frame, the number of minislots included in a slot, the number of symbols and RBs included in a slot or minislot, the number of subcarriers included in an RB, the number of symbols in a TTI, a symbol length, and a cyclic prefix (CP) length can be variously changed.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using at least one of one or more wires, cables, and printed electrical connections, and as some non-limiting and non-exhaustive examples, by using electromagnetic energy having wavelengths in the radio frequency domain, the microwave region, and the light (both visible and invisible) region, and the like.

The reference signal may be abbreviated as RS and may be called pilot according to applicable standards.

As used in the present disclosure, the phrase "based on" does not mean "based only on" unless explicitly stated otherwise. In other words, the phrase "based on" means both "based only on" and "based at least on".

A term "means" in the configuration of each device described above may be replaced with a term such as "unit", "circuit", or "device".

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in any other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout the present disclosure, for example, during translation, if articles such as "a", "an", and "the" in English are added, in the present disclosure, these articles may include a plurality of nouns following these articles.

The term "determining" used in the present disclosure may encompass a wide variety of operations. The term "determining" can include, for example, judging, calculating, computing, processing, deriving, investigating, looking up, search, inquiry (for example, searching in a table, database, or other data structure), and ascertaining. In addition, "determining" can include receiving (for example, receiving information), transmitting (for example, transmitting information), inputting, outputting, and accessing (for example, accessing data in a memory), and the like. In addition, "determining" can include "resolving", "selecting", "choosing", "establishing", "comparing", and the like. In other words, the term "determining" can include any operation. Further, the term "determining" may also be read as "assuming", "expecting", "considering", and the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in the present disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

REFERENCE SIGNS LIST

10 Radio communication system
20 NG-RAN
100 gNB
200 UE
1001 Processor
1002 Memory
1003 Storage
1004 Communication device
1005 Input device
1006 Output device
1007 Bus

What is claimed is:

1. A terminal comprising:
   a transmitting and receiving unit that transmits and receives a slot configured with a plurality of symbols; and
   a control unit that sets a length of a cyclic prefix added to each of the symbols based on a degree of compression of each of the symbols in time domain,
   wherein the control unit increases the length of the cyclic prefix as the compression factor is decreased.

2. The terminal according to claim 1, wherein the control unit sets the length of the cyclic prefix based on a compression factor applied to the time domain.

3. The terminal according to claim 2, wherein the control unit sets the length of the cyclic prefix associated with a minimum compression factor.

* * * * *